United States Patent
Chickering (10) Patent No.: US 10,523,656 B2
(45) Date of Patent: *Dec. 31, 2019

(54) SESSION MIGRATION BETWEEN NETWORK POLICY SERVERS

(71) Applicant: Pulse Secure, LLC, San Jose, CA (US)

(72) Inventor: Roger A. Chickering, Granite Bay, CA (US)

(73) Assignee: Pulse Secure, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/999,513

(22) Filed: Aug. 20, 2018

(65) Prior Publication Data

US 2019/0097995 A1 Mar. 28, 2019

Related U.S. Application Data (63) Continuation of application No. 12/651,081, filed on Dec. 31, 2009, now Pat. No. 10,057,239.

(60) Provisional application No. 61/287,612, filed on Dec. 17, 2009.

(51) Int. Cl.
*G06F 15/16* (2006.01)
*H04L 29/06* (2006.01)
*H04L 29/08* (2006.01)

(52) U.S. Cl.
CPC ........ *H04L 63/0815* (2013.01); *H04L 67/146* (2013.01); *H04L 63/20* (2013.01)

(58) Field of Classification Search
CPC ..... H04L 63/0815; H04L 63/08; H04L 67/14; H04L 67/146; H04L 29/08576; H04L 29/08252; H04L 63/20
USPC ....................................................... 709/229
See application file for complete search history.

(56) References Cited

U.S. PATENT DOCUMENTS

| | | |
|---|---|---|
| 6,609,198 B1 | 8/2003 | Wood et al. |
| 7,010,600 B1 | 3/2006 | Prasad et al. |
| 7,165,122 B1 | 1/2007 | Sitaraman et al. |
| 7,600,263 B1 | 10/2009 | Nguyen et al. |

(Continued)

FOREIGN PATENT DOCUMENTS

CN 1878170 A 12/2006

OTHER PUBLICATIONS

Response to the Examination Report dated Sep. 11, 2018, from counterpart European Application No. 10186871.9, filed Jan. 17, 2019, 12 pp.
Examination Report from counterpart European Application No. 10186871.9, dated May 13, 2019, 5 pp.
"TNC IF-MAP Binding for SOAP," http://www.trustedcomputinggroup.org, May 18, 2009, 99 pp.

(Continued)

*Primary Examiner* — Oleg Survillo
(74) *Attorney, Agent, or Firm* — Shumaker & Sieffert, P.A.

(57) ABSTRACT

A policy device grants access to a client device, without authenticating the client device, when the client device provides a session identifier to the policy device that was previously granted to the client device by a second policy device upon authenticating the client device by the second policy device. In one example, a policy device includes a network interface that receives a session identifier from a client device, wherein the policy device comprises an individually administered autonomous policy server, and an authorization module that grants the client device access to a network protected by the policy device based on the session identifier without authenticating the client device by the policy device. In this manner, the client device need not provide authentication information multiple times within a short time span, and the policy device can deallocate resources when a session migrates to a second policy device.

20 Claims, 7 Drawing Sheets

(56) References Cited

U.S. PATENT DOCUMENTS

| | | | |
|---|---|---|---|
| RE41,210 | E | 4/2010 | Wang et al. |
| 7,954,144 | B1 | 5/2011 | Ebrahimi et al. |
| 8,132,242 | B1 | 3/2012 | Wu |
| 8,291,468 | B1 | 10/2012 | Chickering |
| 8,464,055 | B2 | 6/2013 | Kim et al. |
| 8,627,493 | B1 | 1/2014 | Chickering et al. |
| 8,689,345 | B1 | 4/2014 | Martin et al. |
| 10,057,239 | B2 | 8/2018 | Chickering |
| 2003/0074580 | A1 | 4/2003 | Knouse et al. |
| 2003/0105981 | A1 | 6/2003 | Miller et al. |
| 2003/0145091 | A1 | 7/2003 | Peng et al. |
| 2006/0117106 | A1 | 6/2006 | Abdo et al. |
| 2006/0230265 | A1 | 10/2006 | Krishna |
| 2007/0101406 | A1 | 5/2007 | Zavalkovsky et al. |
| 2007/0101418 | A1 | 5/2007 | Wood et al. |
| 2007/0106670 | A1 | 5/2007 | Yoakum et al. |
| 2007/0208744 | A1 | 9/2007 | Krishnaprasad et al. |
| 2007/0283443 | A1 | 12/2007 | McPherson et al. |
| 2008/0066151 | A1 | 3/2008 | Thomsen et al. |
| 2008/0082987 | A1 | 4/2008 | Mao et al. |
| 2008/0104618 | A1 | 5/2008 | Rogers et al. |
| 2008/0261598 | A1 | 10/2008 | Tinnakomsrisuphap |
| 2009/0109941 | A1 | 4/2009 | Carter et al. |
| 2009/0119699 | A1 | 5/2009 | Crassous et al. |
| 2009/0313466 | A1 | 12/2009 | Naslund et al. |
| 2009/0328186 | A1 | 12/2009 | Pollutro et al. |
| 2010/0197281 | A1 | 8/2010 | Bennett et al. |
| 2010/0263026 | A1 | 10/2010 | Huo et al. |
| 2011/0023091 | A1 | 1/2011 | Lukach et al. |
| 2011/0055627 | A1 | 3/2011 | Zawacki et al. |
| 2011/0093613 | A1 | 4/2011 | Banes et al. |
| 2011/0208838 | A1 | 8/2011 | Thomas et al. |
| 2011/0289553 | A1 | 11/2011 | Carter et al. |
| 2013/0014244 | A1 | 1/2013 | Kranendonk et al. |

OTHER PUBLICATIONS

"Making NAC Security-Aware with IF-MAP," Interop Labs, Network Access Control Interoperability Lab, Metadata Access Point, Apr. 29, 2008, 2 pp.

"Port-Based Network Access Control," IEEE Standard for Local and metropolitan area networks, IEEE Std 802.1X™-2004 (Revision of IEEE Std 802.1X-2001), Dec. 13, 2004, 72 pp.

"TCG Trusted Network Connect, TNC IF-MAP binding for SOAP," Trusted Computing Group, Incorporated, Specification Version 1.0, Revision 25, Apr. 28, 2008, 99 pp.

"Trusted Network Connect IF-MAP Announcement FAQ," Trusted Computing Group, Apr. 2008, 2 pp.

Examination Report from counterpart European Application No. 10186871.9 dated Dec. 14, 2017, 5 pp.

Examination Report from counterpart European Application No. 10186871.9 dated Oct. 31, 2016, 8 pp.

Extended European Search Report for European application No. 10186871.9, dated Mar. 3, 2011, 8 pp.

Response to Communication pursuant to Article 94(3) EPC dated Oct. 31, 2016, from counterpart European Application No. 10186871.9, filed on Feb. 28, 2017, 12 pp.

Response to Extended European Search Report for European application No. 10186871.9, filed Dec. 15, 2011, 17 pp.

Response to the Examination Report dated Dec. 14, 2017, from counterpart European Application No. 10186871.9, filed Apr. 13, 2018, 14 pp.

Translation and Original Notification of the First Office Action dated Apr. 3, 2013 received in corresponding CN Application No. 201010510074.1, 13 pgs.

Translation and Original Notification of the Second Office Action dated Dec. 13, 2013 received in corresponding CN Application No. 201010510074.1, 4 pages.

Prosecution History from U.S. Appl. No. 12/651,081, dated from Apr. 24, 2013 through Apr. 18, 2018, 226 pp.

Response to Examination Report from counterpart European Application No. 10186871.9, filed Sep. 9, 2019, 3 pp.

SESSION MIGRATION BETWEEN NETWORK POLICY SERVERS

This application is a continuation of U.S. application Ser. No. 12/651,081, filed Dec. 31, 2009, which claims the benefit of U.S. Provisional Application No. 61/287,612, filed Dec. 17, 2009, each of which is incorporated herewith by reference in its entirety.

TECHNICAL FIELD

This disclosure relates to computer networks and, more particularly, to access control devices of computer networks.

BACKGROUND

Enterprises and other organizations implement network access control in order to control the ability of client devices to communicate on a computer network. For example, an enterprise may implement a computer network that includes an email server. In order to prevent unauthorized users from communicating with this email server, the enterprise may implement a network access control system that prevents unauthorized users from sending network communications on the computer network unless the users provide a correct username and password. In another example, an enterprise may wish to prevent devices that are infected with computer viruses from communicating with devices on a network of the enterprise. In this example, the enterprise may implement a network access control system that prevents devices that do not have current anti-virus software from communicating on the network.

Three separate types of devices are typically present in networks that implement network access control. These devices typically include client devices, policy devices, sometimes referred to as policy decision points, and access devices. Client devices are devices that are attempting to connect to the network. Policy devices evaluate information from the client devices in order to decide whether to grant the client devices access to a network. One example of a policy device is an authentication server, such as a Remote Access Dial-In User Service ("RADIUS") server. Access devices enforce the decisions made by the policy decision points with regard to individual client devices. Access devices include, for example, wireless access points and network gateway devices.

Access devices are commonly deployed at the edge of the computer network and interface with the client devices by challenging the client devices to provide authentication information prior to granting access to the network. Confronted with this authentication challenge, a given client device then provides authentication information, which the access device forwards to the policy device, which is usually deployed in a more centralized location of the computer network so as to service a plurality of access devices. The policy device authenticates the forwarded authentication information in accordance with one or more policies and forwards the result of the authentication back to the access device. The access device then grants the client device access to the computer network based on the received result.

Typically, when the client device moves to a new physical location, requiring connection to the same computer network via an access device coupled to a different policy device, this access device and the policy device to which the access device is connected require the client device to re-authenticate itself before granting the client device access to the computer network. Such re-authentication commonly occurs regardless of whether the client device was successfully authenticated before.

SUMMARY

In general, this disclosure describes techniques for enabling a network session of a client device to migrate between network policy devices. That is, after a client establishes a network session that is authenticated by a first policy device via a first access device coupled to the first policy device, the techniques of this disclosure enable the client to migrate the network session to a second access device coupled to a second policy device, without requiring re-authentication by the second policy device. In general, a policy device authenticates users and/or client devices that attempt to connect to a network via an associated access device. Following authentication, the policy device provides an authenticated client device with a session identifier, which is also stored by the policy device.

After a client device moves to a new physical location, the client device connects to the network via an access device coupled to a different policy device. Rather than requiring the new policy device to re-authenticate the client device, however, the client device provides the new policy device with the session identifier. The new policy device asserts ownership over the network session and is configured to recognize the authentication performed by the first policy device. The new policy device updates session information to reflect the change in session ownership. In some examples, session information is stored according to a data model defined by an Interface for Metadata Access Point (IF-MAP) standard. In some examples, a dedicated IF-MAP server stores session information for all network sessions of a network, while in other examples, each policy device stores IF-MAP data or other session data for the network sessions owned by the policy device.

In one example, a method includes receiving, with a policy device, a session identifier from a client device, wherein the policy device comprises an individually administered autonomous policy server that stores and applies a plurality of policies to control access to a network, and granting the client device access to the network protected by the policy device based on the session identifier without requesting authentication credentials from a user of the client device, wherein the session identifier uniquely identifies a communication session previously established between the client device and the network. In general, the phrase "individually administered" refers to a policy device being managed as an individual device by a policy management application and potentially having a different configuration from other policy servers, which may also be managed by the policy management application.

In another example, a device includes a network interface that receives a session identifier from a client device, wherein the policy device comprises an individually administered autonomous policy server that stores and applies a plurality of policies to control access to a network, and an authorization module that grants the client device access to the network protected by the policy device based on the session identifier without requesting authentication credentials from a user of the client device, wherein the session identifier uniquely identifies a communication session previously established between the client device and the network.

In another example, a computer-readable medium, such as a computer-readable storage medium, contains, e.g., is encoded with, instructions for a programmable processor of a policy device, wherein the policy device comprises an individually administered autonomous policy server that stores and applies a plurality of policies to control access to a network, and wherein the session identifier uniquely identifies a communication session previously established between the client device and the network. The instructions cause the policy device to receive a session identifier from a client device, retrieve session information corresponding to the session identifier, grant the client device access to a network protected by the policy device based on the session identifier without requesting authentication credentials from a user of the client device, wherein the instructions to grant the client device access to the network comprise instructions to validate the session identifier using the retrieved session information, and, upon granting network access to the client device, assert ownership of the network session by the policy device to remove a prior ownership of the client device from the second policy server.

In another example, a system includes a client device, a first policy device that authenticates the client device to grant access to a network protected by the first policy device and provides a session identifier to the client device, wherein the first policy device comprises a first individually administered autonomous policy server that stores and applies a first plurality of policies to control access to the network, and a second policy device comprising a network interface that receives the session identifier from the client device, wherein the second policy device comprises a second individually administered autonomous policy server that stores and applies a second plurality of policies to control access to the network, and an authorization module that grants the client device access to the network also protected by the second policy device based on the session identifier without requesting authentication credentials from a user of the client device, wherein the session identifier uniquely identifies a communication session previously established between the client device and the network.

The techniques of this disclosure may provide several advantages. For example, these techniques allow a user to relocate to a new physical location, and to continue an existing network session via a separate, individually administered, autonomous policy server, without requiring re-authentication of the user. In this manner, a previously authenticated user may quickly and easily relocate to a new physical location without the potential inconvenience of providing authentication information that were recently provided for the purposes of authentication. Furthermore, when a session relocates from a first policy device to a second policy device, the resources of the first policy device that were devoted to the session are made available for a new session. The deallocated resources may include entries in a session table and/or licenses used by the client device. Examples using IF-MAP to migrate sessions may provide an advantage of loosely coupling policy devices to collaborate together to migrate sessions among themselves.

The details of one or more examples are set forth in the accompanying drawings and the description below. Other features, objects, and advantages will be apparent from the description and drawings, and from the claims.

DETAILED DESCRIPTION

Figure 1A:
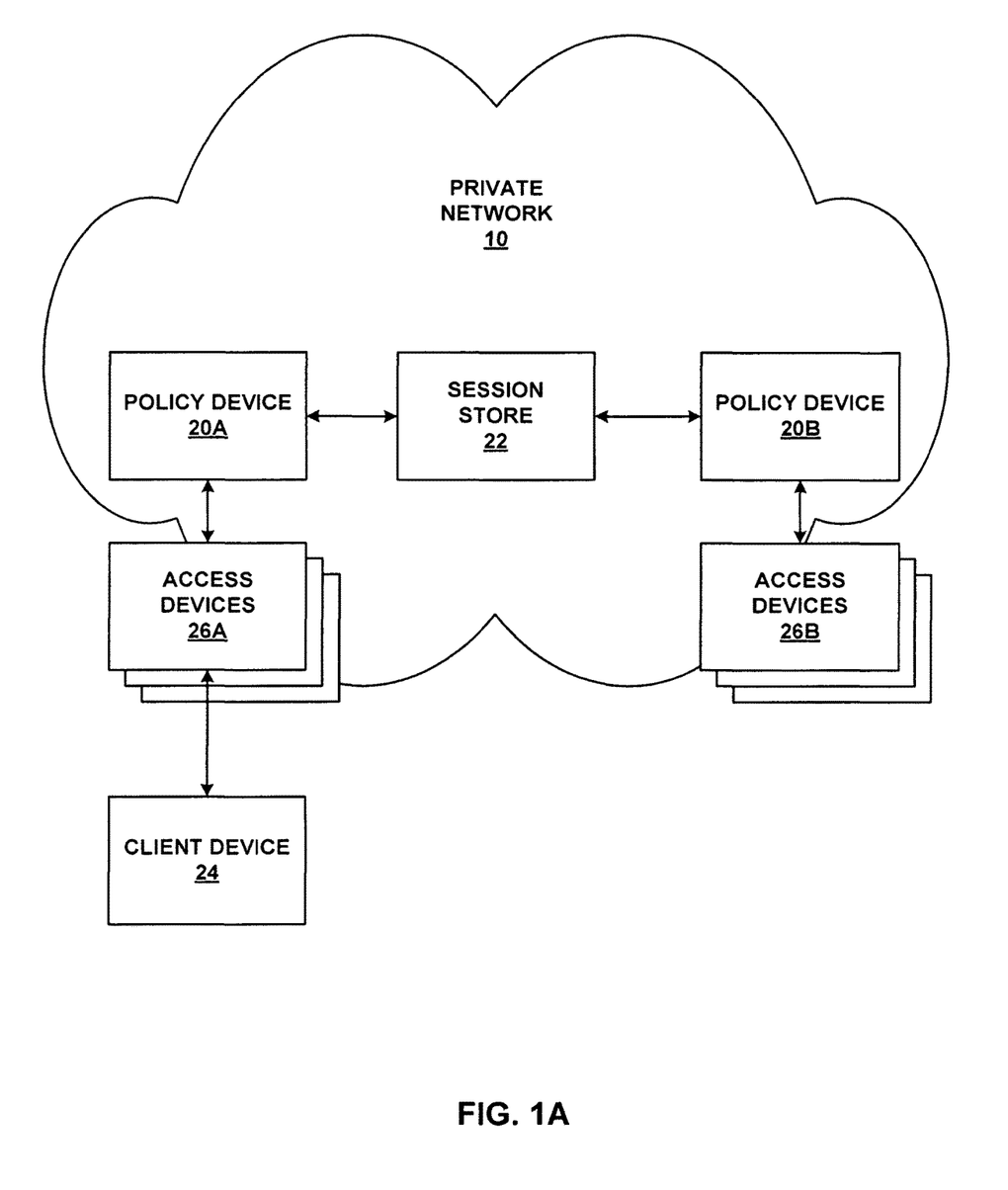
FIGS. 1A and 1B are block diagrams illustrating an example in which a client device initiates a network session with devices of a private network via a first policy device and subsequently migrates such that the network session is controlled by a second policy device.
Figure 1B:
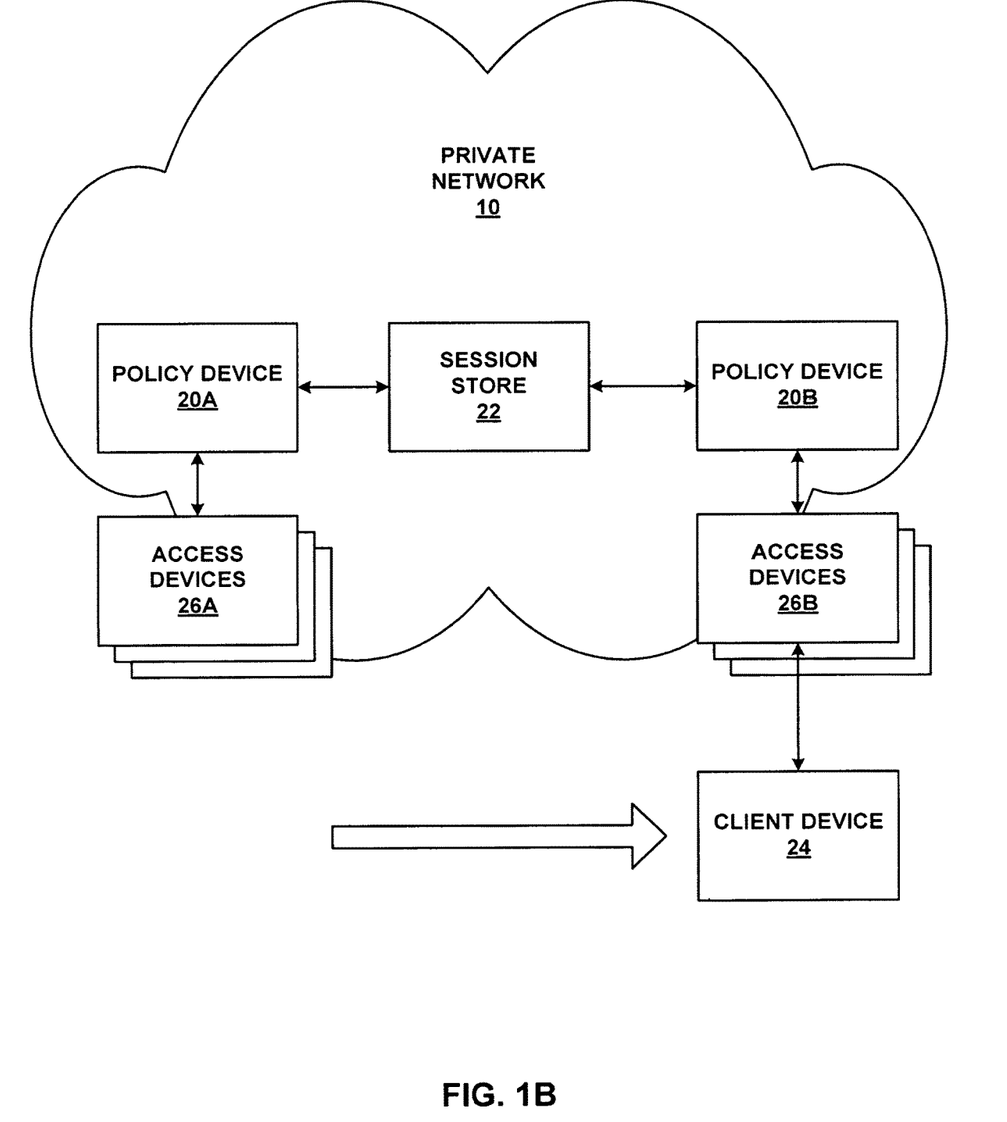

FIGS. 1A and 1B are block diagrams illustrating an example system 9 in which client device 24 initiates a network session with devices of private network 10 via policy device 20A (FIG. 1A), and subsequently migrates such that the network session is controlled by policy device 20B (FIG. 1B). System 9, in the example of FIGS. 1A and 1B includes policy device 20A, policy device 20B, access devices 26A, access devices 26B, and session store 22. Policy device 20A, policy device 20B, access devices 26A, access devices 26B, and session store 22 form a portion of private network 10, in the example of FIGS. 1A and 1B. Private network 10 also includes other devices (not shown), such as, for example, file servers, printers, web servers, databases, network interconnection devices such as routers and/or switches, or other devices.

As shown in FIG. 1A, client device 24 initiates a network session with private network 10 by connecting through policy device 20A. When client device 24 initially connects via one of access devices 26A coupled to policy device 20A, the one of access devices 26A retrieves authentication data from client device 24 and sends the authentication data to policy device 20A, which authenticates client device 24 according to one or more policies that are specific to policy device 20A. The session generally corresponds to a session with private network 10, rather than a particular communication session with devices of private network 10.

In some examples, access devices 26A, 26B are functionally integrated with policy device 20A to form a single device that performs both policy decision-making functions as well as access control functions. In the example of FIGS. 1A and 1B, access devices 26A and 26B are distinct devices from their respective policy devices, i.e., policy devices 20A and 20B. In general, access devices 26A and 26B are responsible for enforcing policy decisions made by respective policy devices 20A and 20B. Thus when policy device 20A determines that a particular client device should be allowed to connect to private network 10, one of access devices 26A allows the client device to access private network 10. Similarly, when policy device 20A determines that a particular client device should be denied access, the one of access devices 26A prevents the client device from accessing private network 10.

In various examples, access devices 26A and 26B comprise any combination of network gateway devices, wired switches, and/or wireless access points. Policy devices 20A and 20B (in addition to other policy devices not illustrated in FIGS. 1A and 1B) may comprise any combination of remote access dial-in user service (RADIUS) servers, VPN servers, servers configured to utilize access control lists (ACLs) having a list of access control entries (ACEs), and/or network access control (NAC) policy devices.

In general, a policy, as defined on policy device 20A and policy device 20B, defines rules for authenticating and authorizing devices and/or users attempting to establish a network session with private network 10. When client device 24 first attempts to connect to private network 10 via one of access devices 26A in the example of FIG. 1A, the one of access devices 26A requests authentication information from client device 24 and passes the authentication information to policy device 20A. Policy device 20A uses one or more policies to determine whether and how to authorize the network session request from client device 24. As discussed in greater detail below, in accordance with the techniques of this disclosure, the one of access devices 26A first requests a session identifier from client device 24.

A session identifier is used to uniquely identify a session between a client device and a private network. However, in this example, client device 24 has not yet established a session with private network 10. Thus the one of access devices 26A determines that client device 24 does not have a session identifier at this time. In one example, following the determination that client device 24 does not have a session identifier, the one of access devices 26A requests authentication credentials from a user of client device 24, such as a username and password, an answer to a secret question, a digital signature, a biometric reading such as a fingerprint or iris scan, a personal identification number (PIN), credentials from client device 24 itself, such as a media access control (MAC) address, or other authentication credentials. The one of access devices 26A forwards the authentication data to policy device 20A to determine whether to grant client device 24 access to private network 10.

Assuming that policy device 20A authorizes client device 24, the one of access devices 26A allows client device 24 to begin a network session with private network 10. Traffic of the network session continues to flow between client device 24 and private network 10 via the one of access devices 26A. In some examples, access devices 26 also utilize policies to assess the security posture of client devices. The identity and posture are used to evaluate authorization policies which determine what kind of network access to grant the client device. Partial access may be granted by placing the endpoint on a quarantine VLAN or by using port ACLs or firewall rules to limit network access. Fine-grained identity-based access control policies may be applied to some or all network traffic between the endpoint and the private network. In some examples, policies are also used after establishing a network session. For example, a policy server may require periodic posture assessments of a client device. If the security posture for the client device changes, the policy server may work with the access devices to change the network access that the client device has in real time.

In accordance with the techniques of this disclosure, following authentication of client device 24, policy device 20A chooses a session identifier for the network session and provides the session identifier to client device 24 via the one of access devices 26A. The session identifier may be a random number, a universally unique identifier, a value provided to policy device 20A by an external identifier server, or any other identifier that very likely will not be the same as another identifier chosen by policy device 20A or any other policy device. While client device 24 remains connected to private network 10 via the one of access devices 26A, policy device 20A may be considered to "own" the network session in that policy device 20A asserts ownership of this session with respect to the session identifier, as described in more detail below. In the example of FIGS. 1A and 1B, policy device 20A publishes the session identifier to session store 22. Session store 22, in the examples of FIGS. 1A and 1B, stores session identifiers that indicate which of policy devices 20 owns each session, a time at which the session was established and the session identifier was generated, and other session information, e.g., an application-layer protocol for the session (such as hypertext transfer protocol (HTTP), file transfer protocol (FTP), simple mail transfer protocol (SMTP), etc.), an identified application for the session, or any other session information of this or another type.

In some examples policy devices 20 interact with session store 22 to determine information for network sessions, determine ownership of network session, and assert ownership of a session when ownership changes. In other examples, each of policy devices 20 include individual session stores, and policy devices 20 communicate with each other to retrieve session information and assert ownership of a session when a client device, such as client device 24, migrates.

At some point after establishing the network session with private network 10 via the one of access devices 26A, as authorized by policy device 20A, client device 24 migrates to a new location that requires the network session to flow through one of access devices 26B coupled to policy device 20B, as shown in FIG. 1B. Although policy device 20B may be configured with the same policies as policy device 20A, in general, policy devices 20A and 2B are each individually administered autonomous policy servers. That is, each of policy device 20A and policy device 20B may be configured with individual, distinct, or otherwise different policies from one another such that policy device 20A applies a first policy to authorize client device 24 while policy device 20B applies a second policy different from the first policy applied by policy device 20A to authorize the same client device, e.g., client device 24. For example, although each of policy devices 20 may be configured to recognize authentications performed by other ones of policy devices 20, each of policy devices 20 may grant different permission levels and/or access rights to client device 24. In accordance with the techniques of this disclosure, policy device 20B need not reauthenticate client device 24, even though policy device 20B may provide a different level of access or different permissions than policy device 20A.

In accordance with this disclosure, an individually administered autonomous policy server may, for example, comprise one device of a cluster of physical devices. An individually administered policy server may use another device such as an LDAP server to verify a user's credentials. A set of individually administered policy servers may be collectively managed by a network management application. In this context, "individually administered" refers to each policy server being managed as an individual device by the policy management application and potentially having a different configuration from other policy servers.

When client device 24 moves to a location requiring access to private network 10 via policy device 20B, policy device 20B first requests a session identifier from client device 24. In this example, client device 24 has a session identifier that was provided by policy device 20A. Client device 24 provides the session identifier from policy device 20A to policy device 20B, in response to the request from policy device 20B. In general, when policy device 20B receives a session identifier from client device 24 that policy device 20B determines is a valid session identifier, policy device 20B grants client device 24 access to private network 10, without reauthenticating client device 24. That is, policy device 20B is able to grant client device 24 access to the network without requesting authentication credentials from a user of client device 24. In this manner, policy device 20B can authorize client device 24 transparently to the user of client device 24. Policy device 20B asserts ownership of the session by updating session store 22. In this manner, client device 24 is able to easily migrate between different physical locations, without the necessity for a user of client device 24 to repeatedly provide authentication credentials.

In one example, policy device 20A comprises an SSL-VPN server and policy device 20B comprises an on-site RADIUS server. A user of client device 24 (e.g., a laptop computer) begins a network session with private network 10 by logging in via policy device 20A to begin an SSL-VPN network session while the user is at home. Later, the user takes client device 24 to a location that is on-site, e.g., at the user's desk in the office. Client device 24 migrates the session initiated with policy device 20A to policy device 20B and continues the session, without having to provide user authentication credentials to policy device 20B, in accordance with the techniques of this disclosure.

In some examples, policy device 20B determines whether the session identifier is valid by checking session store 22 to determine whether the session identifier received from client device 24 is present in session store 22. In some of these examples, policy device 20B additionally determines whether the session identifier is valid by determining whether a time limit for the session identifier has expired. That is, in one example, policy device 20B is configured with a policy that dictates that session identifiers older than a certain period of time, e.g., an hour, are invalid. Accordingly, when the session identifier is not present in session store 22, or when the session identifier is present in session store 22 but is nevertheless determined to be invalid, e.g., because the session identifier has expired, policy device 20B reauthenticates client device 24 by requesting authentication credentials from a user of client device 24 and/or client device 24 itself.

In some examples, session store 22 comprises an Interface for Metadata Access Point (IF-MAP) server. In such examples, session store 22 stores session information in accordance with a data model conforming to the IF-MAP standard. "IF-MAP" refers to an emerging standardized data model that enables network equipment vendors to interoperate in provisioning network access. The group responsible for introducing IF-MAP, known as the Trusted Computing Group (TCG), is encouraging vendors to accept this new IF-MAP standard and vendors are releasing devices compliant with this standard.

The IF-MAP standard provides not only a vendor-neutral or cross-vendor data model that can be used to store session information but also provides an IF-MAP protocol by which to access the session information stored according to this standard, vendor-neutral data model. The IF-MAP protocol supports various IF-MAP messages or communications by which to publish session information, search session information stored within session store 22, subscribe to session information stored within session store 22, and poll session store 22 for session information to which a given device is subscribed. More information concerning the IF-MAP cross-vendor or vendor-neutral data model and protocol can be found in a specification entitled "TNC IF-MAP binding for SOAP," published Apr. 28, 2008 by the Trusted Computing Group, the entire contents of which are hereby incorporated by reference. IF-MAP has also been described in Interop Labs, "Making NAC Security-Aware with IF-MAP," Network Access Control Interoperability Lab, Apr. 29, 2008, the entire contents of which are hereby incorporated by reference.

Examples that utilize IF-MAP can utilize either single-valued metadata or multi-valued metadata. When an IF-MAP client publishes single-valued metadata, the new data replaces any previously existing metadata. Accordingly, IF-MAP clients that have subscribed to an identifier on which the metadata was published are notified of the change, in accordance with the IF-MAP protocol. In one example, client device 24 establishes a session with policy device 20A. Policy device 20A, in turn, publishes authentication information metadata attached to an access request identifier, whose name is derived from a session identifier communicated to client device 24. Later, when client device 24 migrates its session to policy device 20B, policy device 20B publishes its own authentication information metadata attached to the same access-request identifier. In this example, in which the authentication information is declared to be single-value metadata, the authentication information published by policy device 20B replaces the authentication information published by policy device 20A. Policy device 20A is notified of the change by an IF-MAP server, e.g., session store 22, and removes its session for client device 24. Similar functionality can also be achieved using multi-value metadata by combining publication of new authentication information metadata with deletion of any previously existing authentication information metadata.

In some examples that utilize an IF-MAP server, sessions can be migrated between policy devices that are within the same IF-MAP federation and the same Authentication Group. Two policy devices are generally in the same IF-MAP federation if they are clients of the same IF-MAP server or if their IF-MAP servers are replicas of one another. Two policy devices are in the same Authentication Group if both devices are configured with the same Authentication Group string. The Authentication Group string is configured as part of a Sign-In policy. This means that the same policy device may belong to more than one Authentication Group, with a different Authentication Group per sign-in policy. In some examples, prior to prompting the client device for credentials, a policy device informs the client device of the Authentication Group for the policy device. The client device can then consult a connection store to see if the client device has a session identifier for the Authentication Group. If so, the client device passes the session identifier to the policy device. If the policy device determines that the session identifier represents a valid authentication that is eligible for migration, the policy device provisions a session for the endpoint without prompting for further credentials. The policy device may still require a health check of the client device in some examples.

In some examples, a centralized session store, such as session store 22, is not used, and instead each policy device 20 stores the session identifiers and session information for the sessions it owns. When a session migrates, e.g., causing a session to be transferred from policy device 20A to policy device 20B, policy device 20B queries the client device to retrieve the session identifier from the client device, then queries the policy device (policy device 20A, in this example) to retrieve the session information, using the session identifier. Policy device 20A then transfers the session information to policy device 20B, causing policy device 20B to obtain ownership of the session associated with the client device.

The techniques implemented by policy devices 20 and, in some examples, session store 22, may provide several advantages. For example, these techniques allow a user of client device 24 to relocate from a location at which a network session is controlled by policy device 20A to a new physical location at which the network session is controlled by policy device 20B. The user of client device 24 is able to continue the existing network session via policy device 20B, which comprises a separate, individually administered, autonomous policy server, without re-authentication of the user. In this manner, a user who was previously authenticated by policy device 20A may quickly and easily relocate to the new physical location without the potential inconvenience of providing authentication credentials to policy device 20B that were recently provided for the purposes of authentication to policy device 20A. Furthermore, when a session relocates to policy device 20B, the resources of policy device 20A that were devoted to the session are freed and made available for a new session. Examples using IF-MAP to migrate sessions may provide an advantage of loosely coupling policy devices 20 to collaborate together to migrate sessions among themselves.

Figure 2:
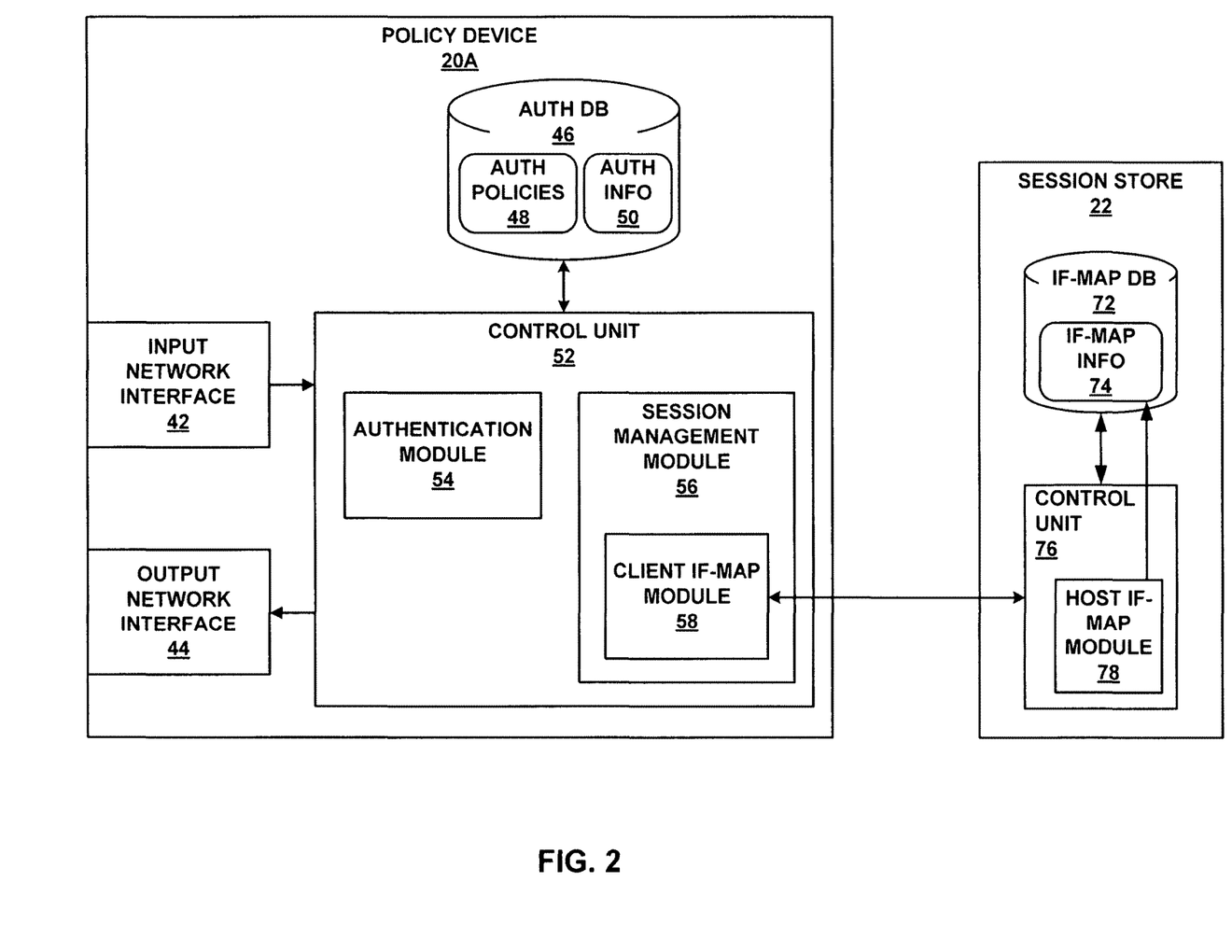
FIG. 2 is a block diagram illustrating example arrangements of components that implement various aspects of the techniques described in this disclosure for a policy device and a session store.

FIG. 2 is a block diagram illustrating example arrangements of components for policy device 20A and session store 22. Policy device 20B generally includes components similar to those of policy device 20A in FIG. 2, although policy device 20A is discussed for purposes of example. In the example of FIG. 2, policy device 20A includes input network interface 42, output network interface 44, authentication database (auth db) 46, and control unit 52. Control unit 52 includes authentication and authorization module 54, session management module 56, and client IF-MAP module 58.

In general, control unit 52 comprises any suitable arrangement of hardware, software, and/or firmware to perform the techniques attributed to control unit 52. In various examples, control unit 52 may include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components. Control unit 52 also, in various examples, may include a computer-readable storage medium, such as random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, or optical media comprising executable instructions for causing the one or more processors to perform the actions attributed to them. Moreover, although authentication and authorization module 54 and session management module 56 are described as separate modules, in some examples, authentication and authorization module 54 and session management module 56 are functionally integrated. In some examples, authentication and authorization module 54 and session management module 56 correspond to individual hardware units, such as ASICs, DSPs, FPGAs, or other hardware units.

Input network interface 42 and output network interface 44 generally correspond to any suitable network interfaces for communicating across a network. In various examples, input network interface 42 and/or output network interface 44 correspond to Ethernet interfaces, gigabit Ethernet interfaces, network interface cards, or a modem such as a telephonic modem, cable modem, or satellite modem. Input network interface 42 and output network interface 44 are coupled to respective access devices, either directly or indirectly. In some examples, input network interface 42 and output network interface 44 are integrated into a common hardware unit, but are illustrated as separate units for purposes of example and explanation.

In general, authentication and authorization module 54 receives connection requests from client devices, such as client device 24 (FIGS. 1A, 1B) that request access to a private network protected by policy device 20A, such as private network 10 (FIGS. 1A, 1B) via input network interface 42, which is coupled to one or more respective access devices, such as access devices 26A. In some examples, policy device 20A includes a plurality of input network interfaces 42, each of the plurality of input network interfaces being coupled to a respective access device. In some examples, a single input network interface is coupled to a plurality of access devices via network switches and/or routers. Similarly, output network interface 44 may be coupled to one or more access devices. Authentication and authorization module 54 determines whether to grant the client device (client device 24, in this example) access to private network 10. In accordance with the techniques of this disclosure, upon receiving a connection request, authentication and authorization module 54 requests a session identifier from client device 24.

When client device 24 does not have an existing session with private network 10, client device 24 responds to the request from authentication and authorization module 54 to indicate that client device 24 does not have a session identifier. In this case, authentication and authorization module 54 authenticates client device 24 using information stored in authentication database 46, e.g., authentication and authorization policies 48 and authentication information 50. Authentication and authorization policies 48 comprise data defining rules by which to authenticate client devices based on authentication data received from the client devices, such as usernames, passwords, and/or biometric data for users of the client devices, MAC addresses of the client devices, digitally signed data from the client devices, digital certificates from the client devices, or any other authentication data. Authentication information 50 stores data for purposes of comparison with authentication data received from client devices. Authentication and authorization policies 48 define the manner in which to authenticate client devices by comparing authentication data received from the client devices with authentication information 50.

Authentication and authorization module 54 compares the authentication data received from a client device, such as client device 24, to authentication information 50, in accordance with authentication and authorization policies 48, to determine whether to grant the request from client device 24. Assuming that authentication and authorization module 54 authenticates client device 24, authentication and authorization module 24 causes session management module 56 to create a new session for client device 24. In the example of FIG. 2, session management module 56 causes client IF-MAP module 58 to publish session information for the new session.

Session store 22 stores session information for sessions owned by each of policy devices 20, including policy device 20A in FIG. 2. Control unit 76 executes host IF-MAP module 78 to service IF-MAP requests from client IF-MAP module 58, and to publish (retrieve) IF-MAP information to (from) IF-MAP database 72. As with control unit 52, control unit 76 may generally comprise any combination of hardware, software, and/or firmware for performing the tasks attributed to control unit 76.

In the situation where client device 24 does not have an existing session with private network 10, client IF-MAP module 58 publishes session information to session store 22. The published session information includes an identification of policy device 20A (that is, an identifier for the policy device that published the session information), a session identifier, and authentication information describing how policy device 20A authenticated client device 24, including the identity used in that authentication. In general, session management module 56 generates the session identifier for the newly created session. Client IF-MAP module 58 also subscribes to updates to the session information, e.g., to receive notifications when the ownership of the session changes to a different policy device.

On the other hand, when client device 24 has an existing session with private network 10, client device 24 responds to the request from authentication and authorization module 54 to indicate the session identifier for the existing session. Authentication and authorization module 54 determines whether the session identifier is valid by causing client IF-MAP module 58 to query session store 22 with the session identifier. In general, client IF-MAP module 58 queries session store 22 to determine whether session store 22 currently stores a session corresponding to the session identifier. Client IF-MAP module 58 asserts ownership of the session for client device 24 by publishing session information to session store 22. The session information includes an identification of policy device 20A, a session identifier, and authentication information.

The authentication information is derived from the authentication information that was previously associated in session store 22 with the session identifier. The session information published by policy device 20A replaces the previous session information associated with the session identifier. When the cardinality value for the session information is single value, the replacement happens by virtue of the IF-MAP data model, because only a single value for the session information metadata may exist for a particular session identifier in session store 22. When the cardinality value for the session information is multi-value, policy device 20A replaces the session information by deleting the old session information and publishing the new session information. In either case, session store 22 informs the policy device that had previously published session information for the session identifier of the changes. The policy device that had previously published session information for the session identifier interprets the changes to mean that policy device 20A now owns the session.

In some examples, after determining that the session identifier is associated with an existing session, authentication and authorization module 54 further determines whether the session identifier is valid, e.g., by determining whether the session identifier is recent enough to remain valid and/or whether the policy device that produced the session identifier performed sufficient authentication procedures to authenticate client device 24.

In general, assuming that the session identifier for the session is valid, authentication and authorization module 54 does not request additional authentication credentials from client device 54. Instead, authentication and authorization module 54 presumes that the authentication performed by the previous policy device was sufficient to authenticate client device 24. Accordingly, authorization module 54 grants access to private network 10 to client device 24. On the other hand, when the session identifier is not valid, authentication and authorization module 54 requests additional authentication credentials from client device 24.

In this manner, control unit 52 and the modules thereof are examples of hardware units of a policy device, comprising an individually administered autonomous policy server, that receive a session identifier from a client device and grant the client device access to a network protected by the policy device based on the session identifier without authenticating the client device by the policy device.

Figure 3A:
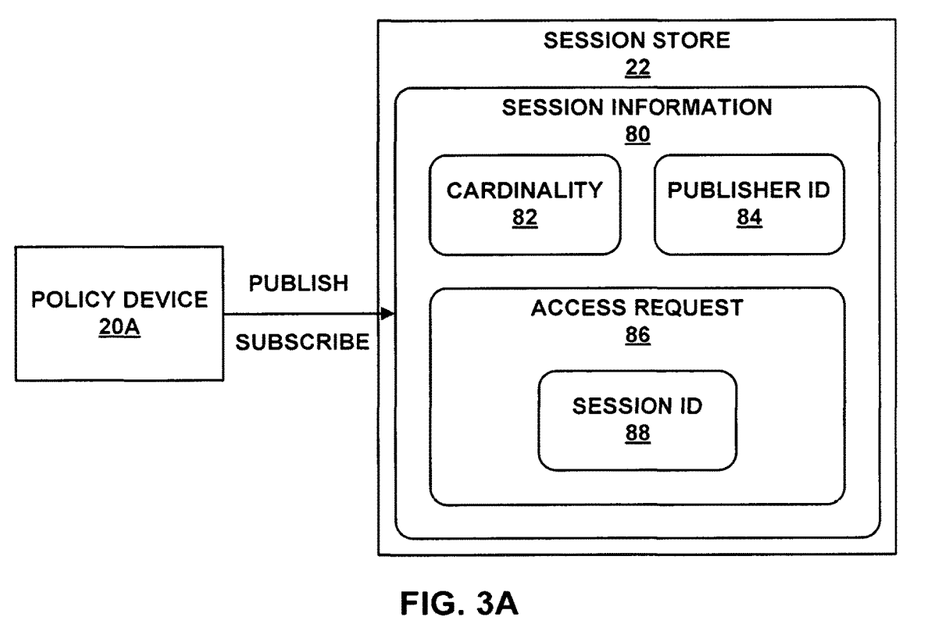
FIGS. 3A and 3B are conceptual diagrams illustrating session information compliant with the Interface for Metadata Access Point (IF-MAP) specification.
Figure 3B:
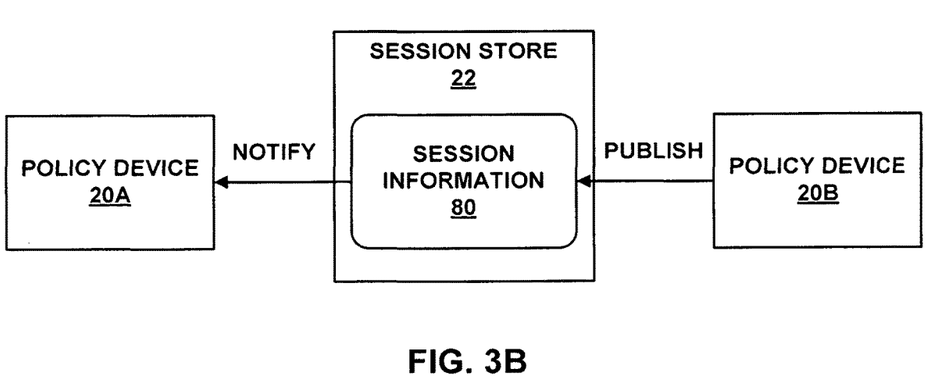

FIGS. 3A and 3B are conceptual diagrams illustrating session information compliant with IF-MAP. FIG. 3A illustrates publication of and subscription to session information 80 by policy device 20A. In the example of FIG. 3A, it is assumed that session information 80 corresponds to a new session for a client device, e.g., client device 24, that does not have an existing session with private network 10. Moreover, it is assumed that policy device 20A authenticates client device 24, that is, that authentication data received from client device 24 matches authentication information 50 (FIG. 2). Session information 80 of FIG. 3A includes cardinality 82, publisher identifier (publisher ID) 84, and access request 86 that includes session ID 88.

In some examples, session ID 88 is the session identifier chosen by policy device 20A to represent client device 24's session. In other examples, session ID 88 is a hash of the session identifier chosen by policy device 20A to represent client device 24's session. Examples of hash functions are a message-digest algorithm 5 (MD5) hash, a secure hash algorithm (SHA) hash, or any other hash function or combination of hash functions. In some examples, the value of session ID 88 is a hex-encoded SHA256 hash of the session identifier provided to client device 24. This enables a policy device to map from a session identifier to the IF-MAP session information without exposing the session identifier itself into IF-MAP.

When policy device 20A grants a request from client device 24 for a new session with private network 10, policy device 20A publishes session information 80 to session store 22. In accordance with the example of FIG. 2, session information 80 comprises IF-MAP metadata. Access request 86 represents the access request from client device 24, and it incorporates session ID 88. In some examples, rather than sending the full value of session ID 88 in access request 86, access request 86 instead includes a hashed value of the session identifier for session ID 88.

Policy device 20A sets publisher ID value 84 to an identifier for policy device 20A, e.g., the publisher ID assigned to policy device 20A by session store 22, to indicate that policy device 20A owns the session associated with session information 80. In this manner, policy device 20A creates a new entry in session store 22 representative of the newly formed session between client device 24 and private network 10, and also asserts ownership of the newly formed session. Policy device 20A also subscribes to updates to session information 80, in case ownership of the session changes. In some examples, ownership of the entries in session store 22 published by a policy device is indicated by an "authenticated-by" link to the IP address or other identifier associated with the authenticating policy device.

Authentication information 89 published by policy device 20A includes information about the authentication of client device 24 by policy device 20A. For example, authentication information 89 may include the username or machine identity used to authenticate client device 24, an indication of the method used to authenticate client device 24, and/or attributes which may be used by a policy device to authorize network access for client device 24. In some examples authorization information 89 may include one or more security assertion markup language (SAML) authentication assertions.

In some examples, session information 80 includes additional information regarding the session. For example, session information 80 may include any or all of a username for a user of client device 24, lightweight directory access protocol (LDAP) information, and/or group membership(s) for client device 24, an IP address of client device 24, a media access control (MAC) address of client device 24, an identification of a user of client device 24, the user's role, a capability value for client device 24, a device attribute for client device 24, and/or, among other session information.

FIG. 3B illustrates publication of session information 80 by policy device 20B to indicate a change of ownership of the session between client device 24 and private network 10. It is assumed, in the example of FIG. 3B, that a session has already been formed between client device 24 and private network 10, e.g., as described above with respect to FIG. 3A. In general, policy device 20B requests a session identifier from client device 24 and, in response to receiving a session identifier from client device 24, computes session ID value 88. Policy device 20B uses session ID value 88 to retrieve session information 80 from session store 22. Policy device 20B uses session information 80 to determine whether to grant client device 24 access to the network without prompting client device 24 for additional authentication data. Assuming policy device 20B grants access to client device 24 based on the data in session information 80, Policy device 20B publishes its own session information 80 to session store 22, replacing the session information published by policy device 20A. The publisher ID 84 value of session information 80 published by policy device 20B is set by session store 22 to a value that indicates that policy device 20B is the owner of session information 80.

In any case, after policy device 20B updates session information 80, session store 22 notifies policy device 20A that ownership of the session has been transferred away from policy device 20A. In some examples, session store 22 further notifies policy device 20A that the new owner of the session is policy device 20B. In this manner, ownership transfers to policy device 20B. Moreover, policy device 20B becomes the owner of the session without re-authenticating client device 24, but instead by being configured to recognize the authentication performed by policy device 20A. After receiving notice that ownership has transferred, policy device 20A frees the resources that were previously devoted to the session, which allows these resources to be used for a new session with a different client device.

Figure 4A:
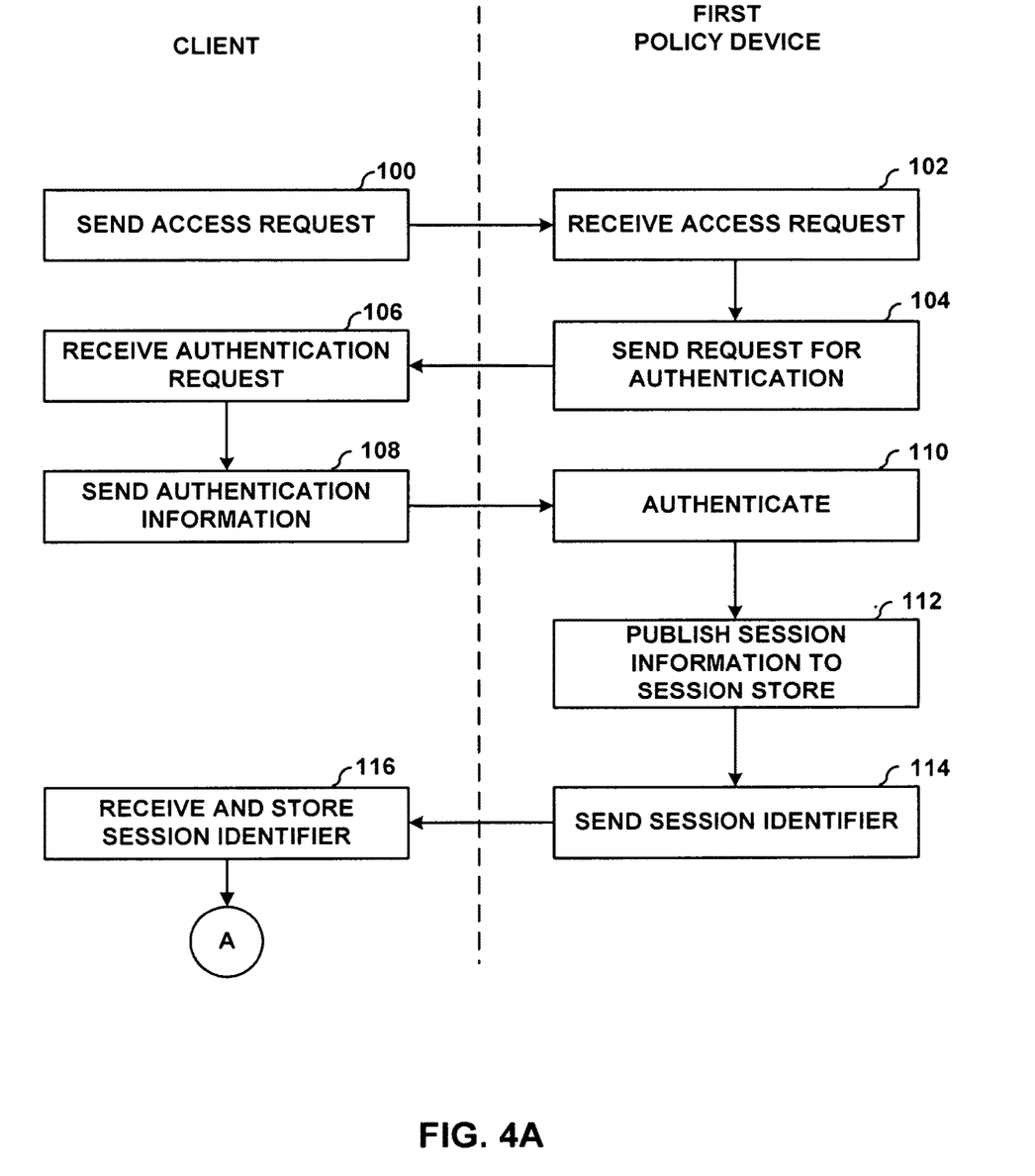
FIGS. 4A and 4B are flowcharts illustrating an example method for initially creating a session between a client device and a private network by a first policy device (FIG. 4A), and subsequently transferring ownership of the session from the first policy device to a second policy device (FIG. 4B).
Figure 4B:
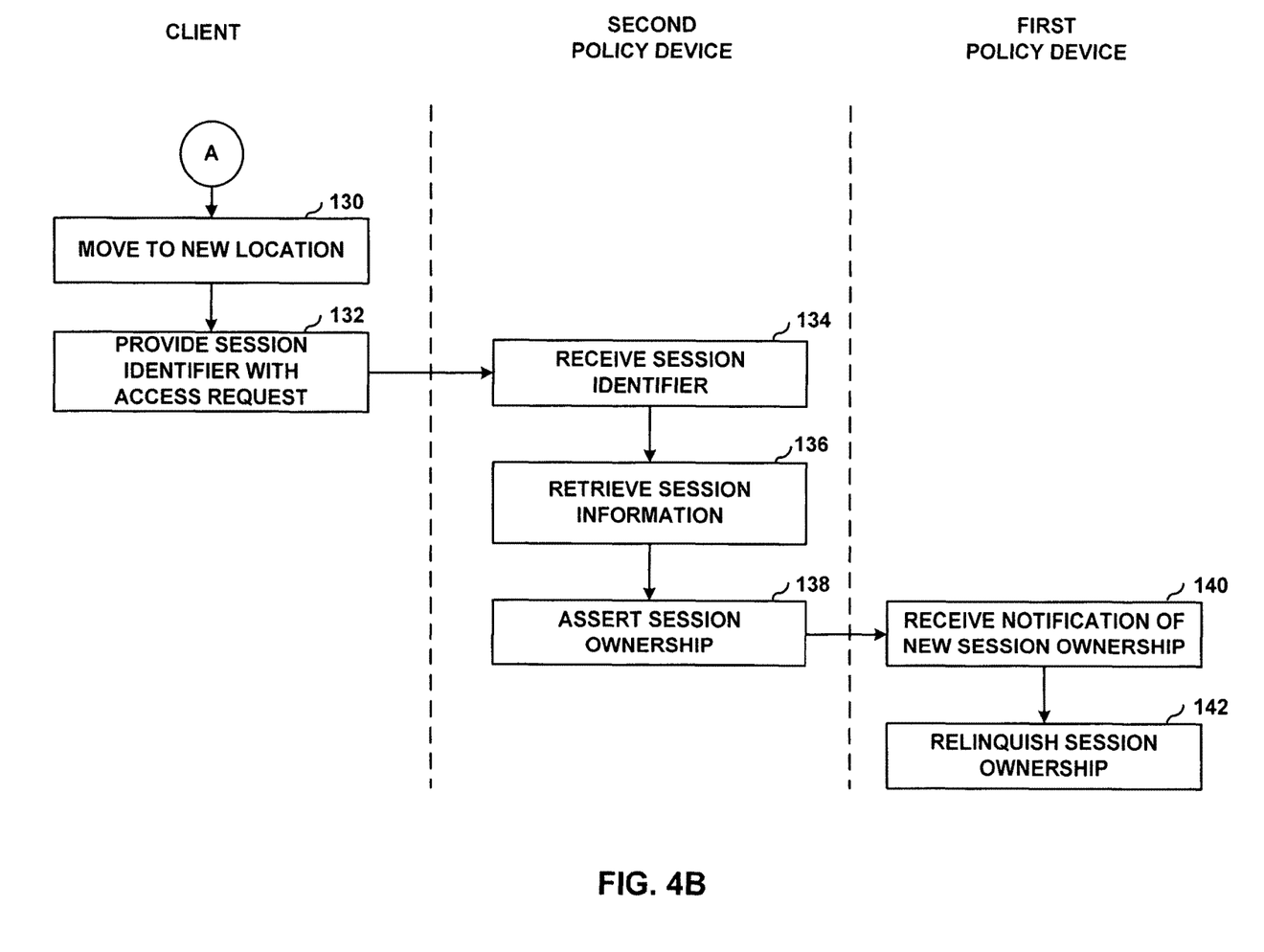

FIGS. 4A and 4B are flowcharts illustrating an example method for initially creating a session between client device 24 and private network 10 by a first policy device, e.g., policy device 20A (FIG. 4A), and subsequently transferring ownership of the session from the first policy device to a second policy device, e.g., policy device 20B (FIG. 4B). Although described with respect to the components of FIGS. 1-3 for purposes of example, it should be understood that other client and policy devices are capable of implementing techniques similar to those of FIGS. 4A and 4B.

With respect to the example of FIG. 4A, client device 24 initially sends an access request to policy device 20A (100). It is assumed in the example of FIG. 4A that client device 24 does not have an existing session with private network 10. The access request generally corresponds to a typical request to begin a network session. In one example, the access request comprises an extensible authentication protocol (EAP) message. Although described as sending the access request "to" policy device 20A, in general, the access request is sent to private network 10 via one of the access devices 26A. Nevertheless, as illustrated in FIG. 1A, the access request is received and inspected by policy device 20A.

Policy device 20A receives the access request (102) and determines that client device 24 is not associated with an existing network session. In some examples, policy device 20A queries session store 22 to determine whether client device 24 is not associated with an existing network session. In some examples, policy device 20A initially requests a session ID from client device 24. In some examples, policy device 20A presumes that an access request that does not include a session ID is an access request for a new session, whereas an access request that includes a session ID is an assertion by client device 24 that client device 24 is associated with an existing network session. In any case, with respect to the example of FIG. 4A, policy device 20A determines that client device 24 is not associated with an existing network session, and therefore, policy device 20A requests authentication data from client device 24, e.g., a username and password for a user of client device 24.

Upon receiving the authentication request (106), a user of client device 24 provides the requested authentication data to policy device 20A (108). In some examples, the authentication data also includes information not provided directly by the user, but automatically by client device 24, e.g., a MAC address, an IP address, a digital certificate, or other information to identify client device 24. The authentication data may also include information about the health posture of client device 24, such as whether anti-virus software is running. When policy device 20A receives the authentication data from client device 24, policy device 20A uses authentication information 50 (FIG. 2) (110) to evaluate the authentication data.

Assuming that the authentication data received from client device 24 is acceptable according to authentication information 50, policy device 20A creates a new session for client device 24 with private network 10, which includes generating a session ID and publishing session information, including the session ID and an identifier of policy device 20A to session store 22 (112). In examples that do not use a centralized session store, policy device 20A stores the session information for the new session locally.

Policy device 20A also provides the session ID to client device 24 (114). Client device 24 stores the session ID locally, such that if client device 24 relocates to a new location that is managed by a distinct policy device, client device 24 can provide the session ID to the policy device, without needing to resubmit authentication data.

In the example of FIG. 4B, it is assumed that client device 24 has already been authenticated by policy device 20A in accordance with a method similar to that of FIG. 4A. Client device 24 then does in fact relocate to a new location that is managed by policy device 20B (130). Client device 24 provides the session ID received from policy device 20A to policy device 20B to indicate that client device 24 has an existing network session (132). In some examples, client device 24 automatically provides the session ID to policy device 20B upon recognizing that policy device 20A is no longer available. In some examples, policy device 20B requests the session ID from client device 24, and client device 24 provides the session ID to policy device 20B.

In any case, policy device 20B receives the session ID from client device 24 (134). Assuming that the session ID is valid, e.g., has not expired and is present in session store 22, policy device 20B retrieves any necessary session information from session store 22 (or, in examples that do not use a centralized session store, from policy device 20A) (136). In various examples, policy device 20B retrieves any or all of a username for a user of client device 24, lightweight directory access protocol (LDAP) information, and/or group membership(s) for client device 24. Policy device 20B also asserts ownership of the session (138), e.g., by publishing an identifier of policy device 20B to the session information stored by session store 22, in examples that use a centralized session store, or by informing policy device 20A that policy device 20B is now taking ownership of the session.

In examples using a centralized session store, policy device 20A receives a notification from session store 22 that ownership of the session has changed (140). In examples without a centralized session store, policy device 20A receives a notification from policy device 20B directly that policy device 20B is taking ownership of the session (140). In either case, policy device 20A relinquishes ownership of the session (142). Accordingly, policy device 20A deallocates resources that were devoted to the session, e.g., by deleting a corresponding entry in a session table for the session and/or freeing up licenses used by client device 24.

Figure 5:
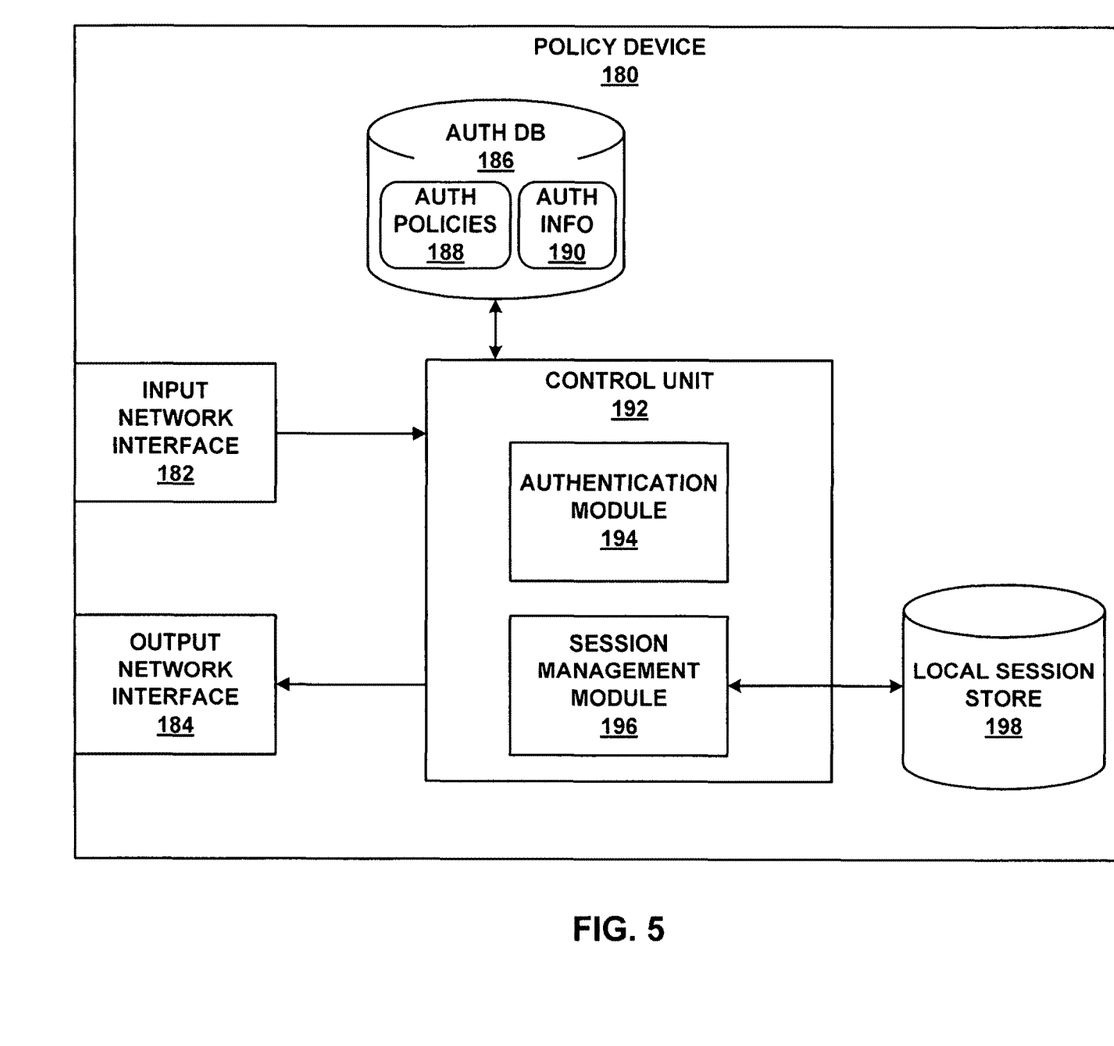
FIG. 5 is a block diagram illustrating another example of a policy device that includes a local session store.

FIG. 5 is a block diagram illustrating another example of a policy device 180 that includes a local session store 198. Policy device 180 also includes input network interface 182, output network interface 184, authorization database 186, and control unit 192. In general, input network interface 182, output network interface 184, authorization database 186, and control unit 192 correspond to the similarly named counterparts of policy device 20A in FIG. 2. For example, authorization database 186 also stores authorization policies 188 and authentication information 190, and control unit 192 also executes authentication and authorization module 194 and session management module 196.

However, session management module 196 of FIG. 5 is configured to interact with local session store 198, rather than a centralized session store, such as session store 22. In general, local session store 198 stores session information for network sessions owned by policy device 180, but not for other sessions with a private network that are not owned by policy device 180.

When a client device that has an existing network session migrates to policy device 180, policy device 180 retrieves session information from the policy device that previously owned the network session, and then policy device 180 asserts ownership of the network session. Policy device 180 stores the retrieved session information in local session store 198. When a client device with a network session owned by policy device 180 migrates to a new location controlled by a separate policy device, the policy device requests session information from policy device 180. Accordingly, policy device 180 provides the session information stored in local session store 198 for the session to the requesting policy device, and then deallocates resources devoted to the session, e.g., by deleting the session information from local session store 198.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
   receiving, with a first policy device via an access device coupled to the first policy device, the access device comprising on of a network gateway, a wired switch, or a wireless access point, an access request including a session identifier from a client device, wherein the first policy device comprises an individually administered autonomous policy server that stores and applies a plurality of policies to grant or deny access, by a plurality of client devices including the client device, to a network, wherein the session identifier uniquely identifies a communication session previously established between the client device and the network, wherein the client device was granted access to the network by a second policy device according to a second policy enforced by the second policy device, the second policy device being separate from the first policy device, wherein the second policy device is not coupled to the access device, and wherein receiving the access request including the session identifier comprises receiving the access request including the session identifier before receiving any other data from the client device;
   in response to receiving the access request including the session identifier, retrieving, with the first policy device, session information for the previously established communication session corresponding to the session identifier, wherein retrieving the session information comprises retrieving the session information from at least one of a session store that stores session information of a plurality of network sessions for the network or the second policy device;

comparing, with the first policy device, the session identifier included in the access request to a session identifier of the session information for the previously established communication session to determine whether the session identifier included in the access request matches the session information for the previously established communication session; and in response to validating that the session identifier included in the access request matches the session identifier of the session information for the previously established communication session, granting, with the first policy device, the client device access to the network protected by the first policy device without requesting authentication credentials from a user of the client device at any time and in accordance with a first policy, the first policy being different than the second policy.

2. The method of claim 1, wherein the session identifier is previously generated by the second policy device in response to authenticating the client device.

3. The method of claim 1, where the session information includes a SAML assertion.

4. The method of claim 1, wherein retrieving the session information comprises retrieving the session information from the session store.

5. The method of claim 4, wherein retrieving the session information comprises:

sending the session identifier to the session store; and
in response to sending the session identifier, receiving the session information from the session store.

6. The method of claim 4, wherein retrieving the session information comprises:

sending a value that is derived from the session identifier to the session store; and
in response to sending the value, receiving the session information from the session store.

7. The method of claim 6, further comprising deriving the value from the session identifier by applying a hash algorithm to the session identifier.

8. The method of claim 1, wherein retrieving the session information comprises retrieving the session information from the second policy device.

9. The method of claim 1, wherein the first policy defines at least one of a first level of access or a first set of permissions for the client device, and wherein the second policy defines at least one of a second, different level of access or a second, different set of permissions for the client device.

10. The method of claim 9, further comprising selecting the first policy based on at least one of a device type for the client device, a media access control (MAC) address for the client device, or a current IP address of the client device.

11. The method of claim 1, wherein the second policy comprises a policy for a virtual private network (VPN), and wherein the first policy comprises a remote access dial-in user service (RADIUS) policy.

12. A system comprising:

An access device comprising one of a network gateway, a wired switch, or a wireless access point; and
a first policy device coupled to the access device, the first policy device comprising:
a network interface that receives an access request via the access device coupled to the first policy device, the access request including a session identifier from a client device, wherein the first policy device comprises an individually administered autonomous policy server that stores and applies a plurality of policies to grant or deny access, by a plurality of client devices including the client device, to a network, wherein the session identifier uniquely identifies a communication session previously established between the client device and the network, wherein the client device was granted access to the network by a second policy device separate from the first policy device according to a second policy enforced by the second policy device, wherein the access device is not coupled to the second policy device, and wherein the network interface receives the access request including the session identifier before receiving any other data from the client device; and
a hardware-based processor that implements a session management module that retrieves session information for the previously established communication session corresponding to the session identifier in response to receiving the access request including the session identifier from at least one of a session store that stores session information of a plurality of network sessions for the network or the second policy device, and an authorization module that compares the session identifier included in the access request to a session identifier of the session information for the previously established communication session to determine whether the session identifier included in the access request matches the session information for the previously established communication session and, in response to validating that the session identifier included in the access request matches the session identifier of the session information for the previously established communication session, grants the client device access to the network protected by the first policy device without requesting authentication credentials from a user of the client device at any time and in accordance with a first policy, the first policy being different than the second policy.

13. The system of claim 12, wherein the first policy defines at least one of a first level of access or a first set of permissions for the client device, and wherein the second policy defines at least one of a second, different level of access or a second, different set of permissions for the client device.

14. The system of claim 13, wherein the hardware-based processor is further configured to select the first policy based on at least one of a device type for the client device, a media access control (MAC) address for the client device, or a current IP address of the client device.

15. The system of claim 12, wherein the second policy comprises a policy for a virtual private network (VPN), and wherein the first policy comprises a remote access dial-in user service (RADIUS) policy.

16. A non-transitory computer-readable storage medium comprising instructions for causing a programmable processor of a first policy device to:

receive an access request via an access device coupled to the first policy device, the access device comprising one of a network gateway, a wired switch, or a wireless access point, the access request including a session identifier from a client device, wherein the first policy device comprises an individually administered autonomous policy server that stores and applies a plurality of policies to grant or deny access, by a plurality of client devices including the client device, to a network, and wherein the session identifier uniquely identifies a communication session previously established between the client device and the network, wherein the client device was granted access to the network by a second policy device according to a second policy enforced by the second policy device, the second policy device being separate from the first policy device, wherein the second policy device is not coupled to the access device, and wherein the instructions that cause the processor to receive the access request including the session identifier comprise instructions that cause the processor to receive the access request including the session identifier before receiving any other data from the client device;

in response to receiving the access request including the session identifier, retrieve session information for the previously established communication session corresponding to the session identifier, wherein the instructions that cause the processor to retrieve the session information comprise instructions that cause the processor to retrieve the session information from at least one of a session store that stores session information of a plurality of network sessions for the network or the second policy device;

compare the session identifier included in the access request to a session identifier of the session information for the previously established communication session to determine whether the session identifier included in the access request matches the session information for the previously established communication session;

in response to validating that the session identifier included in the access request matches the session identifier of the session information for the previously established communication session, grant the client device access to a network protected by the first policy device without requesting authentication credentials from a user of the client device at any time and in accordance with a first policy, the first policy being different than the second policy.

17. A system comprising:

a plurality of access devices including a first access device and a second access device, each of the access devices comprising one of a network gateway, a wired switch, or a wireless access point;

a first policy device coupled to the first access device, wherein the first policy device authenticates a client device to grant access to a network protected by the first policy device according to a first policy enforced by the first policy device, wherein the first policy device provides a session identifier to the client device via the first access device, wherein the first policy device comprises a first individually administered autonomous policy server that stores and applies a first plurality of policies to grant or deny access, by a plurality of client devices including the client device, to the network, wherein the first policy device is not coupled to the second access device; and a second policy device coupled to the second access device and not coupled to the first access device, the second policy device comprising:

a network interface that receives, via the second access device, an access request including the session identifier from the client device, wherein the second policy device comprises a second individually administered autonomous policy server that stores and applies a second plurality of policies to grant or deny access, by the plurality of client devices, to the network, and wherein the network interface receives the access request including the session identifier before receiving any other data from the client device;

a session management module that retrieves session information for the previously established communication session corresponding to the session identifier in response to receiving the access request including the session identifier from at least one of a session store that stores session information of a plurality of network sessions for the network or the first policy device; and an authorization module that compares the session identifier included in the access request to a session identifier of the session information for the previously established communication session to determine whether the session identifier included in the access request matches the session information for the previously established communication session and, in response to validating that the session identifier included in the access request matches the session identifier of the session information for the previously established communication session, grants the client device access to the network without requesting authentication credentials from a user of the client device at any time and in accordance with a second policy, the second policy being different than the first policy.

18. The system of claim 17, wherein the first policy defines at least one of a first level of access or a first set of permissions for the client device, and wherein the second policy defines at least one of a second, different level of access or a second, different set of permissions for the client device.

19. The system of claim 18, wherein the first policy device is further configured to select the first policy based on at least one of a device type for the client device, a media access control (MAC) address for the client device, or a first IP address of the client device, and wherein the authorization module of the second policy device is further configured to select the second policy based on at least one of the device type for the client device, the MAC address for the client device, or a second IP address of the client device.

20. The system of claim 17, wherein the first policy comprises a policy for a virtual private network (VPN), and wherein the second policy comprises a remote access dial-in user service (RADIUS) policy.

* * * * *